BUSY-VERIFICATION AUTOMATIC TELEPHONE SYSTEM

Filed May 14, 1954 8 Sheets-Sheet 1

Feb. 17, 1959 E. J. LEONARD 2,874,225

BUSY-VERIFICATION AUTOMATIC TELEPHONE SYSTEM

Filed May 14, 1954 8 Sheets-Sheet 2

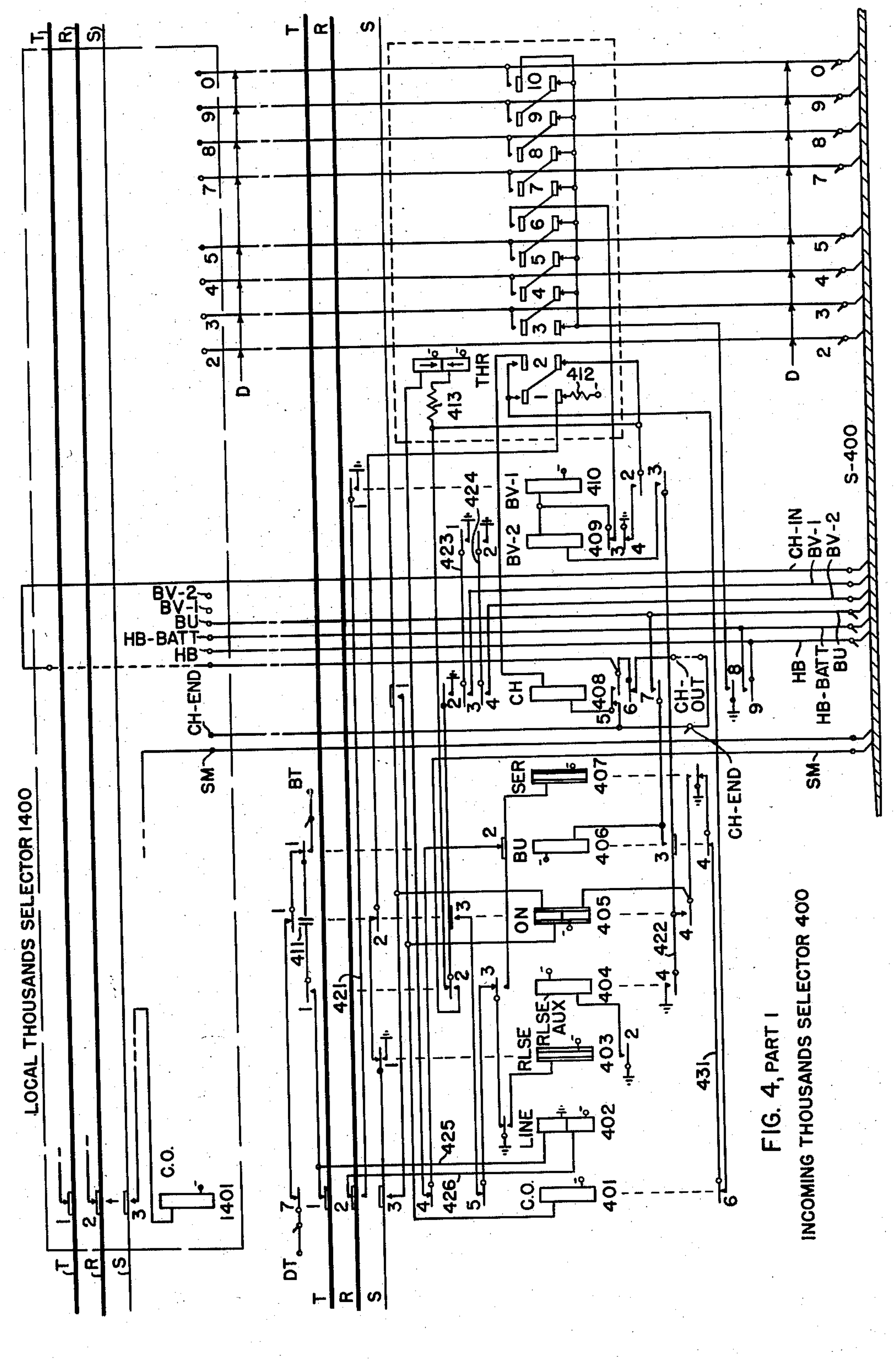
FIG. 4, PART I
INCOMING THOUSANDS SELECTOR 400

Feb. 17, 1959 E. J. LEONARD 2,874,225
BUSY-VERIFICATION AUTOMATIC TELEPHONE SYSTEM
Filed May 14, 1954 8 Sheets-Sheet 4
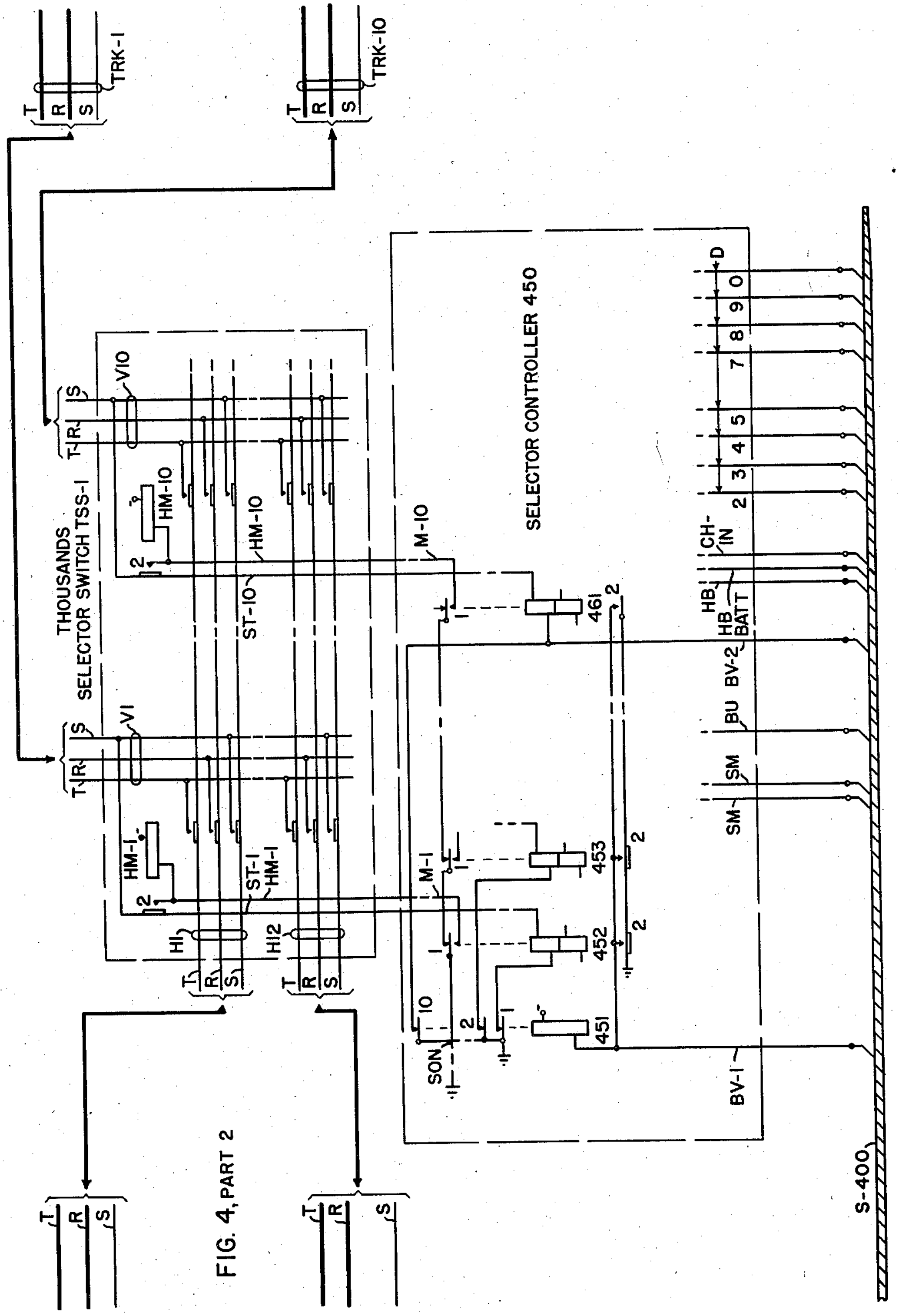
FIG. 4, PART 2

Feb. 17, 1959 E. J. LEONARD 2,874,225

BUSY-VERIFICATION AUTOMATIC TELEPHONE SYSTEM

Filed May 14, 1954 8 Sheets-Sheet 5

BUSY-VERIFICATION AUTOMATIC TELEPHONE SYSTEM
Filed May 14, 1954 8 Sheets-Sheet 6
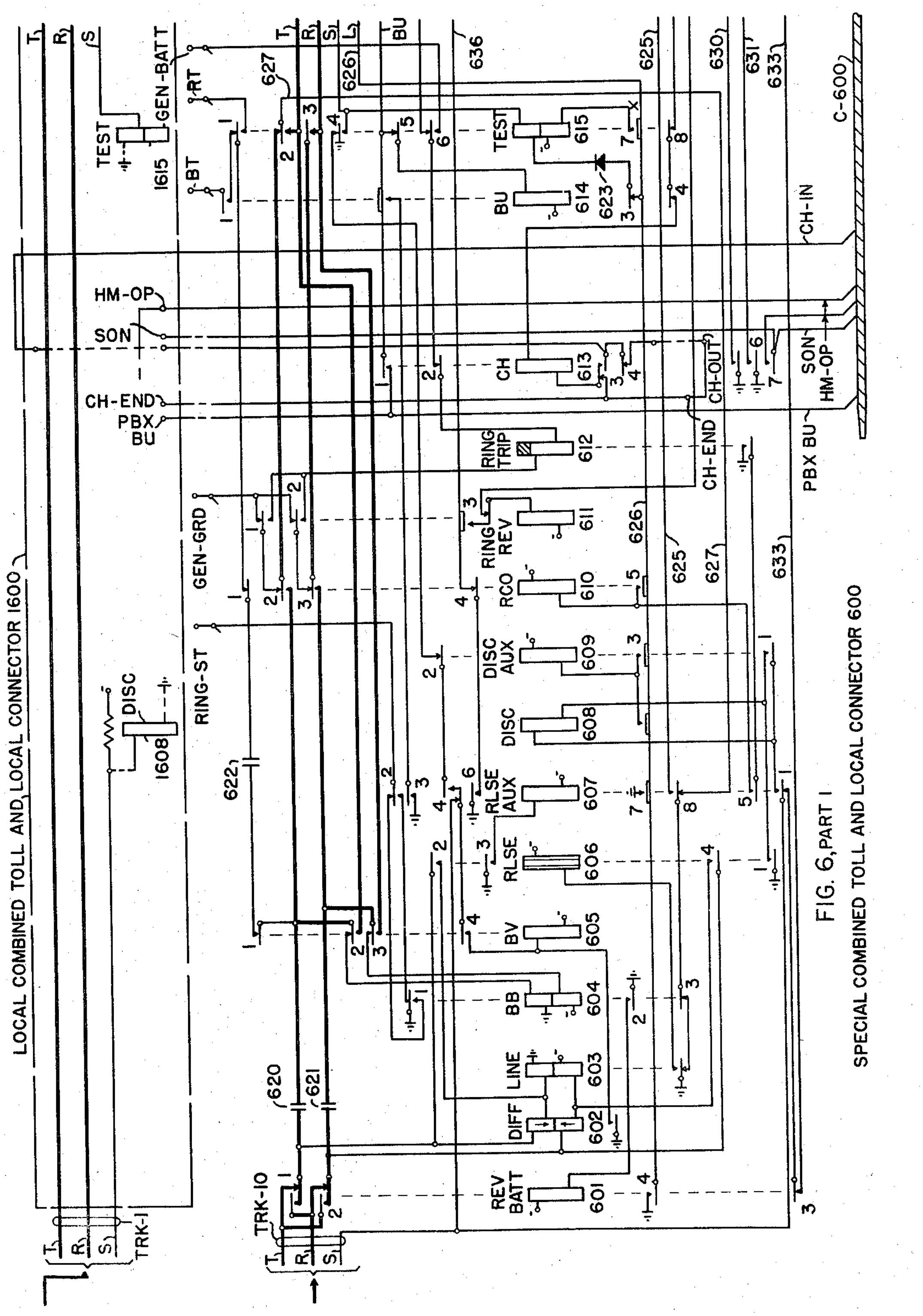
FIG. 6, PART I
SPECIAL COMBINED TOLL AND LOCAL CONNECTOR 600

Feb. 17, 1959 E. J. LEONARD 2,874,225
BUSY-VERIFICATION AUTOMATIC TELEPHONE SYSTEM
Filed May 14, 1954 8 Sheets-Sheet 7
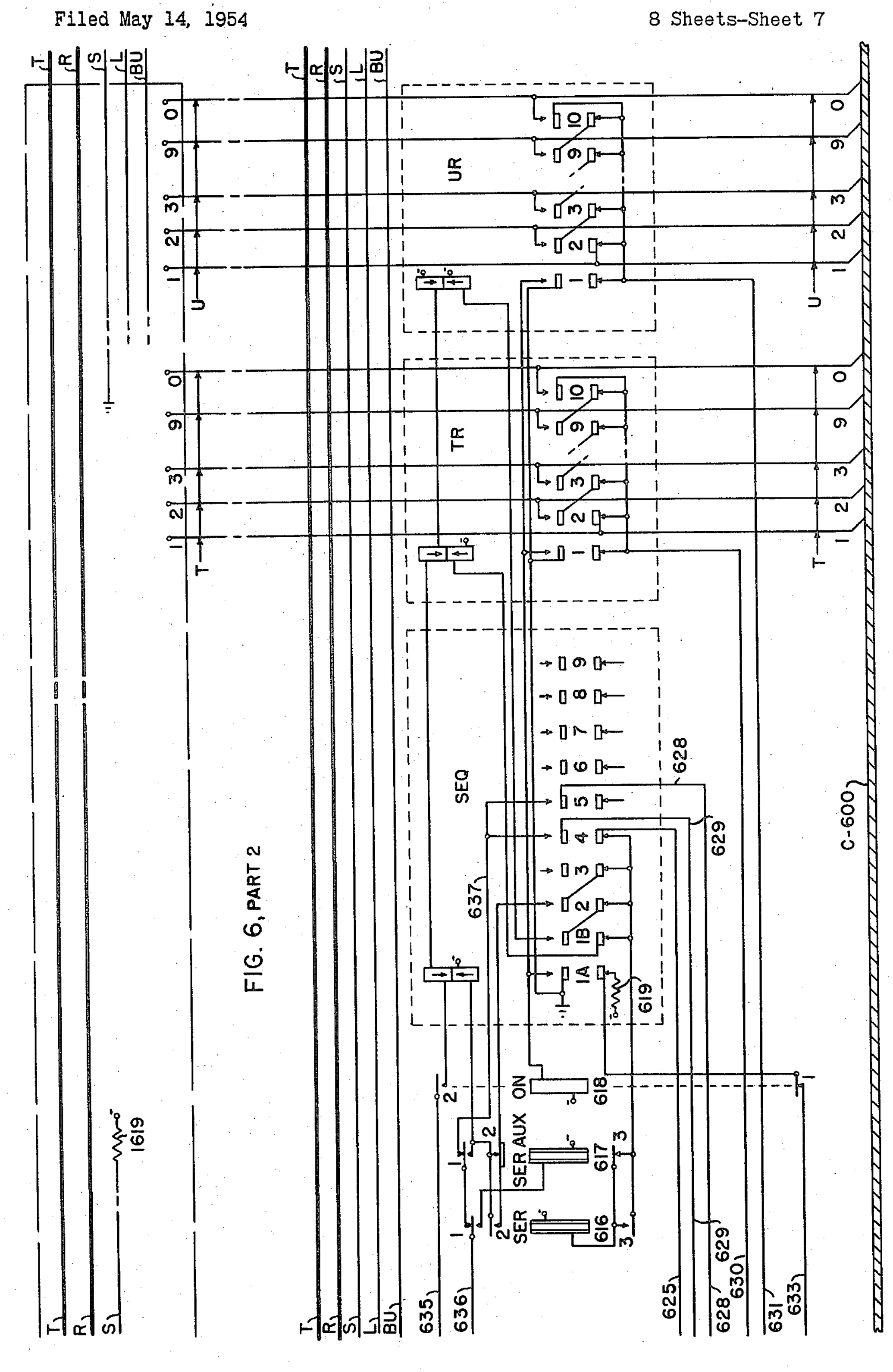
FIG. 6, PART 2

BUSY-VERIFICATION AUTOMATIC TELEPHONE SYSTEM

United States Patent Office 2,874,225 Patented Feb. 17, 1959

2,874,225

BUSY-VERIFICATION AUTOMATIC TELEPHONE SYSTEM

Edward J. Leonard, Chicago, Ill., assignor to International Telephone and Telegraph Corporation, a corporation of Maryland Application May 14, 1954, Serial No. 429,748

11 Claims. (Cl. 179—27)

Figures 1, 2:
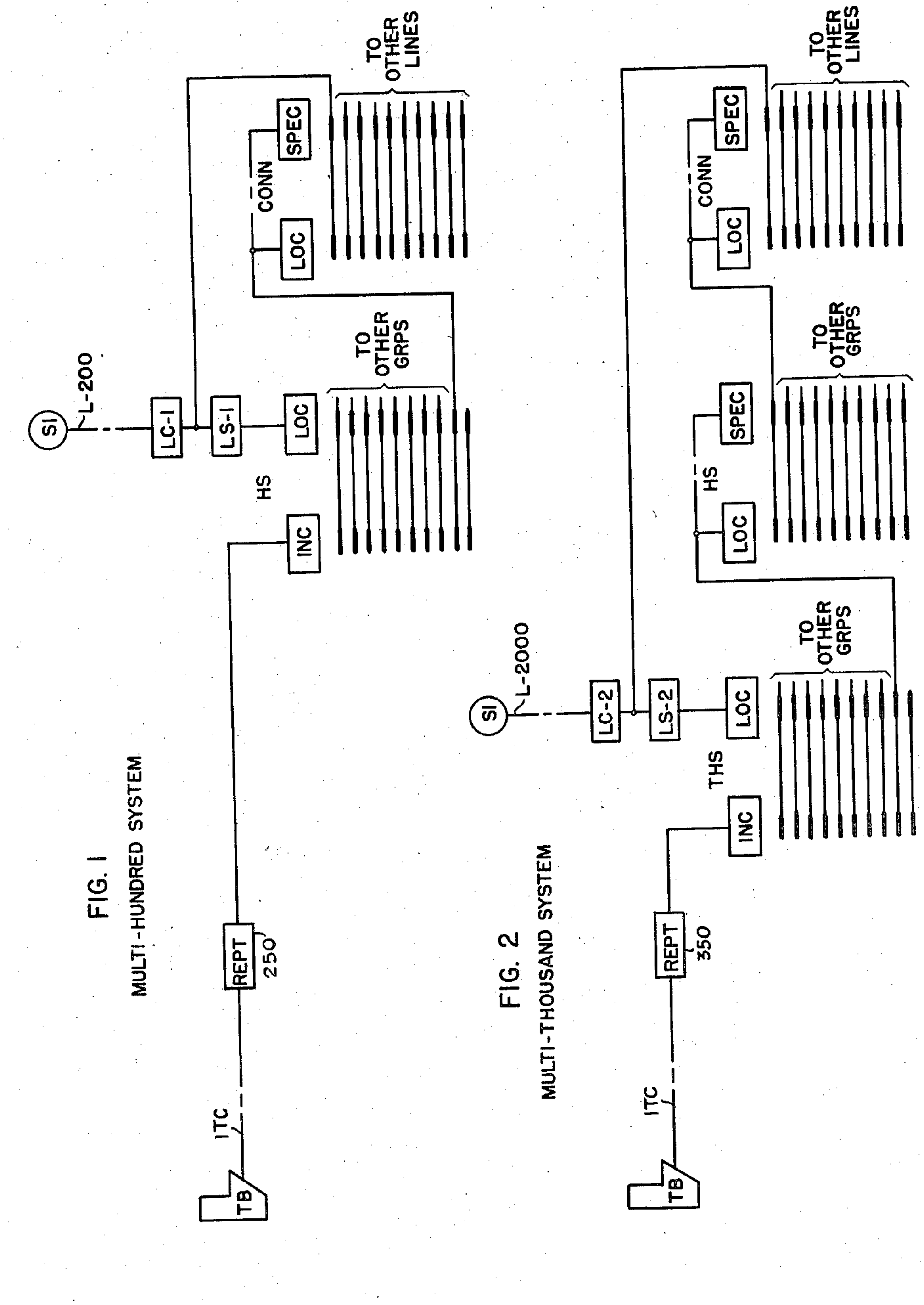

This invention relates to a busy-verification automatic telephone system. Its principal object is to provide a more economical and satisfactory busy-verification automatic telephone system of the type wherein verification service is accorded over authorized paths, subject to the directory number of the concerned line being preceded by a verification-indicating digit.

I. GENERAL DESCRIPTION

In most telephone systems, provisions are made to enable any authorized staff members, such as a toll operator, to use special switching apparatus or to specially condition the usual switching apparatus to establish a connection to a called line which is marked busy. Such a busy-overriding connection may be made to enable a toll call to be offered to the called line, or to enable an operator to verify that the line is in use as distinct from being out of order. Verification or busy-verification herein refers to any such busy-overriding connection.

Where verification connections are set up through special switching apparatus, it is common practice to prefix a verification digit to the number of any line whose busy condition is to be verified, which digit operates the first switch of the usual train to seize an idle switch in the special train. Such a system thus uses a verification prefix to the called number.

Where verification connections are set up through the usual switching apparatus, one common practice is to suffix a verification digit to the number of the called line, which digit acts to condition the connector in use to override the busy signal and to connect telephonically with the busy line. Such a system thus uses a verification suffix to the called number.

Where both types of verification systems are in use in respective exchanges, or offices, in an area served by a common toll board, it is highly advantageous to adapt one of the verification operational plans to conform to the other. It is accordingly an object of the invention to provide a digit-prefix busy-verification system which is applicable to an installation wherein the verification connections are made through the usual switches, whereby the same operating technique may be used as for installations wherein the verification connections are made through special switches.

A more specific object is to provide a satisfactory and economical arrangement wherein the verification prefix digit, when received at an installation wherein verification service is through the usual switches, is stored and a corresponding mark is advanced through the switches of the train to be effective to condition the seized connector to make a verification connection.

Another object is to provide control arrangements for restricting verification calls to predetermined paths which include apparatus specially adapted for advancing verification marks.

Another object is to apply the system of the invention to a switching system using a train of combined switches which handle toll and verification calls and also handle calls from subscriber lines.

A feature of the invention resides in the arrangement whereby the routing of a verification call through the switch train is controlled at any stage by common equipment, thereby simplifying the individual items of apparatus.

Another feature resides in the arrangement for advancing verification marks through the switch train by generating a verification-marking pulse at the first switch of the train which subsequent switches record and timely regenerate.

A further feature resides in an arrangement for rendering ineffective a forwarded verification mark which may inadvertently arise when a locally-originated call is being handled.

Other objects and features will become apparent as the description progresses.

It has been chosen to illustrate the invention as embodied in an automatic telephone system such as disclosed in the application of R. W. Hutton et al., Serial No. 359,761, filed June 5, 1953, for a Multi-Group Direct-Access Crossbar Telephone Switching System. Except as hereinafter pointed out, the control and switching apparatus of this invention is similar to corresponding apparatus of the noted Hutton et al. application.

IA. *The drawings*

Referring now to the drawings, comprising Figs. 1 to 7, Figs. 1 and 2 disclose single-line switching diagrams of telephone switching systems embodying the invention. Fig. 1 is a multi-hundred line system and Fig. 2 is a multi-thousand line system.

Figure 3:
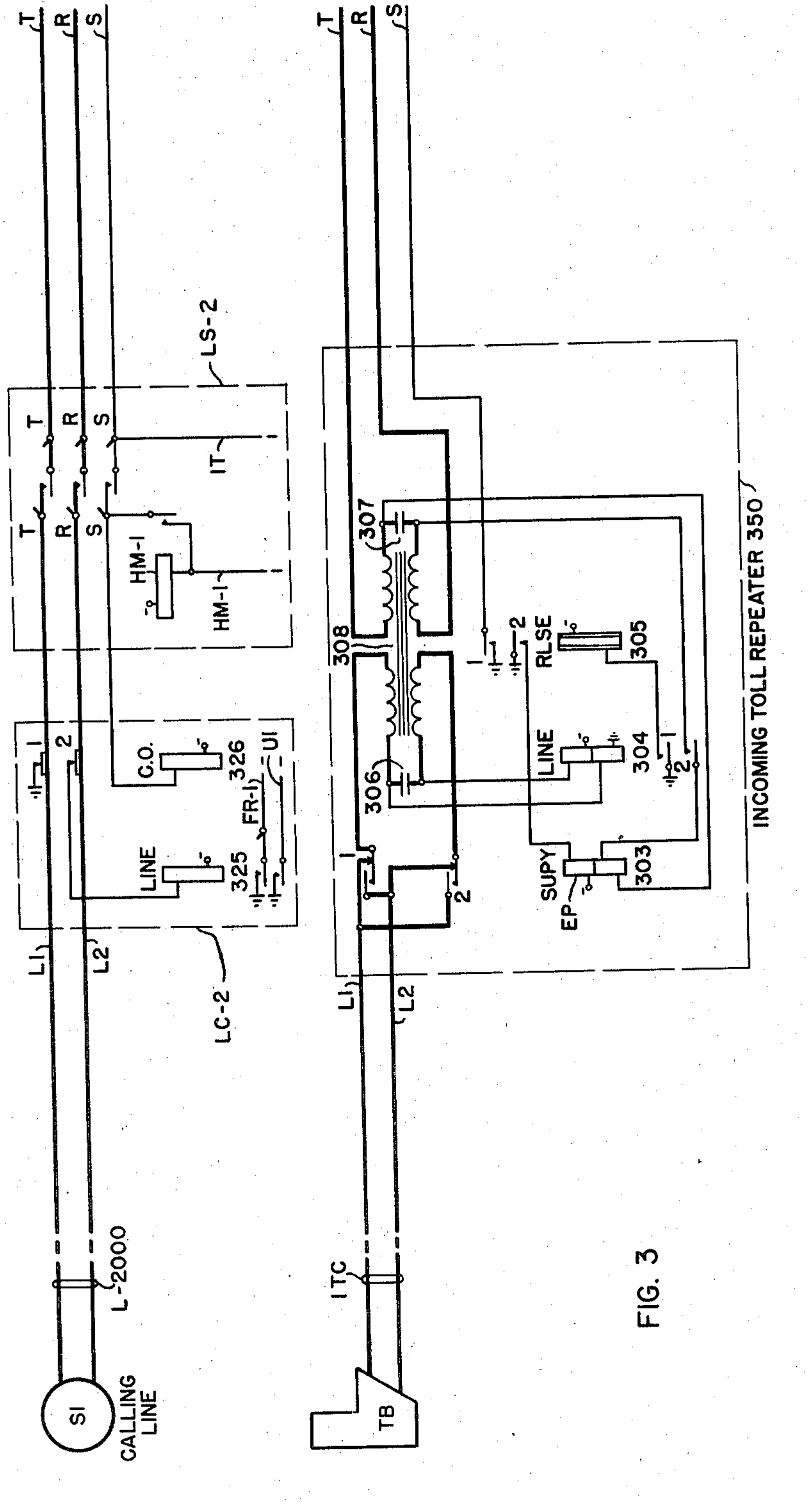
Figure 5:
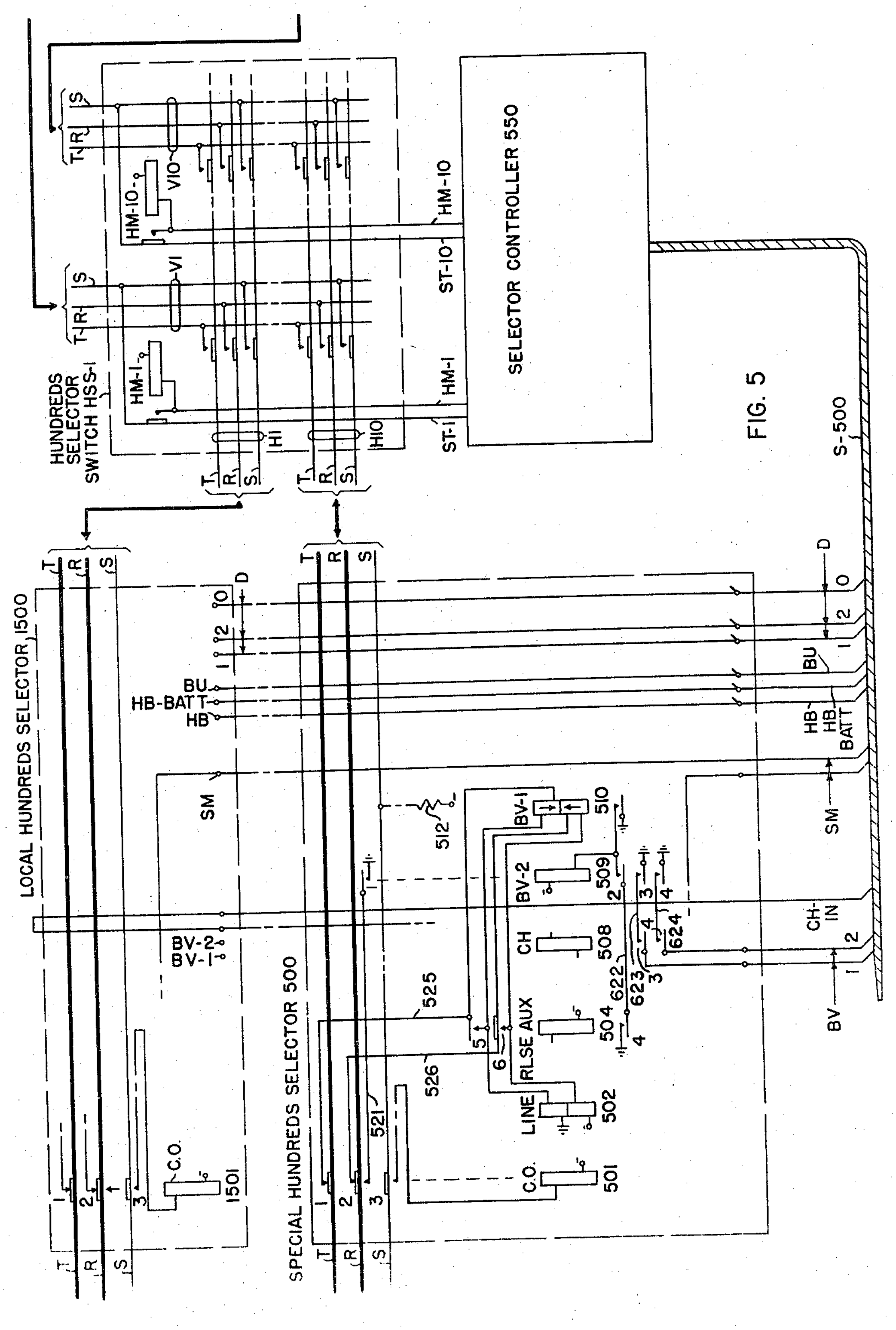
Figure 7:
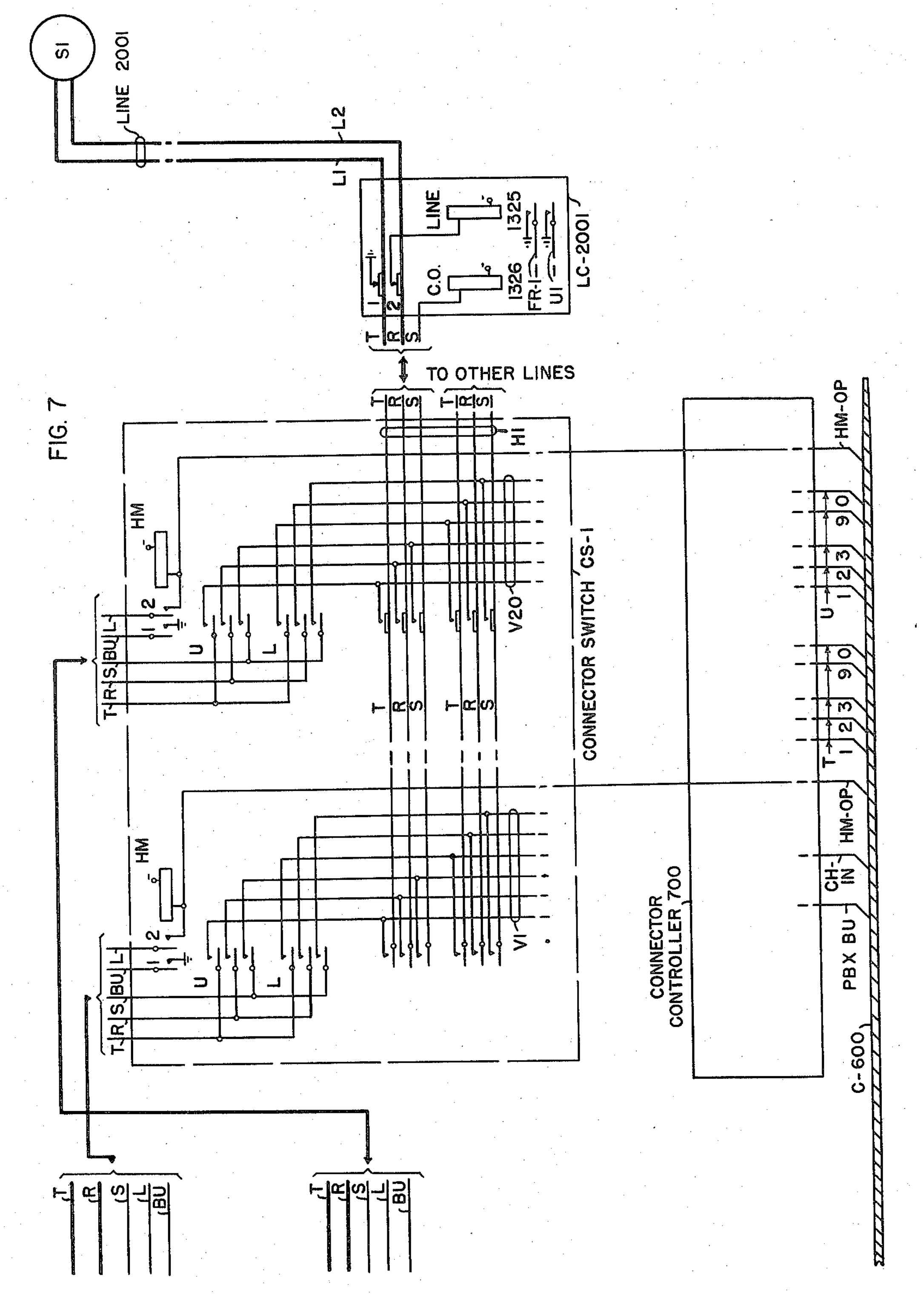

Figs. 3 to 7, taken together, comprise generally a redrawing of Fig. 2 to show in more detail the circuit paths and associated electrical equipment employed in illustrating one embodiment of the invention; Fig. 3 shows control apparatus on a line frame and an incoming toll trunk repeater of a trunk coupler frame; Fig. 4 shows in detail an incoming thousands selector and in partial detail the common control apparatus employed in controlling the selector switches; Fig. 5 shows the selector of Fig. 4 modified; Fig. 6, parts 1 and 2, show the circuit details of the connector embodying features of the invention; and Fig. 7 shows the connector switch and connector controller for extending connections to called lines.

II. GENERAL OPERATION (Figs. 1 and 2)

Referring now to Fig. 1 of the drawings, the general operation of a multi-hundred line exchange in handling toll and local calls will be described.

The multi-hundred exchange is shown accessible from a toll board TB over an incoming trunk cable ITC, while the local lines, such as line 200, has access to the switching equipment through its associated line circuit LC–1.

The toll operator at the toll board TB, desiring to call a local subscriber at line 200, makes connection to the incoming toll trunk line ITC and is connected to the associated incoming hundreds selector through the incoming toll repeater 250. Responsive to the dialing of the directory number of line 200, the connection is extended through the incoming hundreds selector to a regular or special connector from whence it is extended to line L–200 in the well-known manner.

In the event that the toll operator desired to busy-verify line 200, responsive to the seizure of the incoming hundreds selector, an initial verification digit, such as the digit "6," is dialed which routes the toll call to the special connector when the regular trunk digit is thereafter dialed. At the same time, the selector transmits a special verification mark forward which conditions the special connector for verification operation.

If a local line, such as line 200, desires to call another line, line-finding action extends the calling line through the associated line circuit LC–1 and the line switch LS–1 to a regular first selector, or to a special selector if all locals are busy. Responsive to the dialing of the hundreds digit of the directory number, the selector switch extends a connection to a regular connector or to a special connector if all locals are busy. The calling line thereupon dials the tens and units digits of the directory number to extend a connection to the desired line.

Referring now to Fig. 2 of the drawings, the general operation of a multi-thousand line system in extending toll and local calls will be described.

When the toll operator at toll board TB desires to call a subscriber at line 2000, a connection is extended over the incoming toll line ITC and through the incoming repeater 350 (repeater 350 being similar to repeater 250) to the incoming thousands selector. The toll operator thereupon dials the desired directory number and the connection is extended to the desired line through a regular hundreds selector (or special hundreds selector if all locals are busy) and a regular connector (or special connector if all locals are busy).

In the event that the operator desires to busy-verify, a verification digit such as the digit "6" is first dialed in the incoming thousands selector which causes operations to take place in the common equipment to route the call to a special hundreds selector and at the same time to transmit a busy verification mark forward when the regular thousands digit is dialed.

This verification mark conditions the special hundreds selector and common control equipment to direct the call to the special connector following the dialing of the hundreds digit of the desired line. At the same time, a verification mark is again generated and transmitted forward to the special connector. This verification mark conditions the special connector for cutting in on the called line in the event that such line is busy, thereby permitting the toll operator to busy-verify.

When a local line, such as line 2000, in a multi-thousand exchange desires any other line in the exchange, the removal of the receiver at the calling station S1 operates the associated line circuit LC–2 to cause line switch LS–2 to extend a calling line to a regular first selector. Responsive to the receipt of dial tone, the calling subscriber dials the thousands digit of the directory number of the desired line and a connection is extended to an idle one of the hundreds selectors in the called one thousands group. This selector may be a regular hundreds selector or a special hundreds selector depending upon the idle condition of the regulars. Following the dialing of the hundreds digit, a connection is extended to a connector in the hundreds group serving the calling line. A regular connector or a special connector may be seized depending upon the idle and busy condition of regular connectors. Following the dialing of the tens and units digit, a connection is extended to any desired line in the one-hundred group in the manner well-known.

III. DETAILED DESCRIPTION

Referring now to Figs. 3 to 7 of the drawings, a detailed description of the apparatus embodying the invention will be given.

The operation of the disclosed system in completing calls will now be described with particular reference to Figs. 3 to 7 which show in more circuit detail the apparatus indicated on Fig. 2. This part of the description covers in detail the operations of the portions of the apparatus directly included in the talking path from a calling line through first and second selectors to a called line through a combined toll and local connector.

The operations involved in making a regular toll call from toll board TB to a local line such as line 2001 will be described first, followed by a description of a locally-originated call from a local line, such as line 2000, to line 2001, and then by a description of the operations involved in extending a verification toll connection from the operator at toll board TB to an assumed busy local line 2001.

IIIA. *Regular toll call*

The operations involved in making a regular toll-originated call from the toll booard TB to a local line in the disclosed multi-thousands exchange will now be described with reference to Figs. 3 to 7.

IIIA1. *Initiation of call*

When the toll operator at toll board TB desires to call a local line, such as line 2001, connection is made to the incoming toll trunk ITC in the usual manner, which closes a bridge across the line conductors L1 and L2 extending to the incoming toll repeater 350. This bridge is further extended through break contacts 1 and 2 of supervisory relay 303 and through the left-hand windings of repeating coil 308 to the battery and ground connected windings of line relay 304, operating it.

Contacts 1 on line relay 304 extend ground potential to the battery-connected winding of release relay 305 and contacts 2 of line relay 304 bridge the lower winding of the electropolarized supervisory relay 303 across the tip and ring conductors of the assigned incoming thousands selector 400 through right-hand windings of the repeat coil 308. This closed loop across the tip and ring conductors seizes the incoming thousands selector 400 as will be described hereinafter.

Release relay 305 operates and at its make contacts 1 extends ground potential forward on the sleeve conductor of the jumper extending to the incoming thousands selector 400 and at its make contacts 2 extends ground potential to the local winding of supervisory relay 303. Relay 303 does not operate at this time, as the current flow through the windings is in opposing relationship, until the call in answered and reversed battery is received.

IIIA2. *Incoming thousands selector 400*

(Fig. 4, part 1)

As shown in Fig. 4, incoming thousands selector 400 is an incoming toll selector which handles only toll calls which are received through its assigned incoming toll repeater 350. Incoming thousands selector 400 is arranged to mark the call as a busy verification toll call, when required.

Incoming thousands selector 400 is shown in circuit detail and local hundreds selector 1400 is shown only as a dotted rectangle. It is assumed that selectors 400 and 1400 are similar excepting that dial tone and idle-indicating battery are preferably disconnected from incoming thousands selector 400 and that the busy verification relays (409 and 410) of selector 400 are omitted from selector 1400.

In any selector group served by switch TSS–1, only one selector 400 is provided, the remaining selectors being similar to selector 1400. In this way only one special selector is provided at each selector switch.

IIIA2*a*. *Circuit functions of selector 400*

Incoming thousands selector 400 performs the following principal circuit functions:

(1) It receives and absorbs an initial verification digit if the call is a verification call, and is thereafter conditioned to receive the usual thousands digit;

(2) It receives and stores a thousands directory number digit for controlling the associated thousands controller (not shown) in extending calling connections;

(3) It temporarily seizes the chain circuit of its selector section responsive to the receipt of either a verification digit or a thousands digit, subject to such chain being idle, and thereafter guards the seized chain against seizure by any other thousands selectors associated with the switches in the same switch group;

(4) Upon a signal that no idle trunk extending to the next switching stage can be found, it applies busy tone to the calling line and frees the seized chain;

(5) On completion of the extension of a connection to the next stage, it cuts off all unnecessary current-limiting sources and is connected to the next stage with no contact points included in the talking path through the selector; and (6) On switching-through to the next switching stage on verification calls, it generates a pulse of ground which is transmitted forward over the ring conductor of the selected trunk.

IIIA2*b*. *Relay functions of selector 400*

The ten relays (401 through 410) of incoming thousands selector 400 have principal functions assigned thereto as follows:

Relay 401 (Cutoff) operates to cut-off the line relay from the calling line, thereby freeing the talking conductors from external apparatus;

Relay 402 (Line) operates when the selector is seized and restores thereafter, under control of the calling device or hookswitch, whenever the calling line loop is open;

Relay 403 (Release) is slow-releasing by virtue of a copper sleeve under its winding; it is operated by the line relay; it remains operated during pulsing, but releases when the line relay remains restored for a substantial fraction of a second;

Relay 404 (Release Auxiliary) is operated from contacts on the release relay and aids in the performance of the release relay functions;

Relay 405 (Off-Normal) is slow-restoring; is operated on the start of the dialing of the first digit; and remains operated until the selector is released;

Relay 406 (Busy) is operated from the common control apparatus to apply busy tone signals to the calling line, when necessary;

Relay 407 (Series) is operated by the line relay; is slow-releasing because of the copper sleeve under its winding; it operates at the beginning of the series of dial pulses and restores only after the line relay has come to rest operated;

Relay 408 (Chain) is operated on the completion of the dialing of the initial verification digit or the thousands digit of the directory number by seizing the chain circuit of the selector section containing the calling selector for giving it the exclusive use of the common control apparatus; and Relays 409 and 410 (Busy Verification) are operated on the completion of the dialing of the verification digit to mark the common control apparatus that the call is a verification call and to prepare to advance a verification mark to the next switching stage.

The impulse counter THR registers the number of impulses in the verification digit or the thousands digit dialed; at its break contacts 1, it removes the idle-indicating battery supply resistor as a guard measure; at its make contacts 1 aids in the digit 1 absorption; and at its make contacts 2 prepares the operate circuit of the chain relay 408.

IIIA2*c*. *Selector 400 operation*

When incoming thousands selector 400 is seized by the closed loop from toll repeater 350, an operate circuit is completed for line relay 402 through break contacts 1 and 2 of cutoff relay 401. Line relay 402 operates and at its make contacts 1 extends ground potential to the battery-connected winding of release relay 403.

Release relay 403 operates and at its break-make contacts 1 extends ground rearwardly on the sleeve conductor S and at its make contacts 2 extends ground potential to the battery-connected winding of release auxiliary relay 404.

The return of ground on the sleeve conductor S when the incoming thousands selector is used as a local thousands selector maintains the concerned hold magnet and cutoff relay of the line circuit operated, as will be pointed out hereinafter with respect to a locally-originated call.

Release auxiliary relay 404 operates and at its make contacts 1, connects dial tone to the calling line if used as a local thousands selector; its make contacts 3 prepares an operate circuit for the series relay 407 and its make contacts 4 ground common locking wire 422.

The calling operator dials the thousands digit of the directory number of the called line or dials a single digit verification digit followed by the dialing of the usual thousands digit. Each time the calling device at toll board TB is operated to transmit a series of circuit-interruption impulses, line relay 402 is restored momentarily for each such interruption impulse in a series, comprising from one to ten impulses, depending upon the digit dialed. Release relay 403 remains operated throughout any series of impulse-induced restorations of line relay 402, it being slow-restoring because of its indicated copper sleeve and relatively light spring load.

Series relay 407 operates promptly upon the first restoration of line relay 402, its operate circuit being from break contacts of the line relay, make contacts 3 of the release auxiliary relay 404 and the battery-connected winding of relay 407. Being slow-restoring because of its indicated copper sleeve, series relay 407 remains operated throughout the digit series of momentary restorations of the line relay.

With release relay 403 maintained continuously operated, each restoration of line relay 402 delivers an impulse at its break contacts to the battery-connected winding of series relay 407, as noted and further transmits the ground impulses through break contacts 2 of busy relay 406 and break contacts 5 of cutoff relay 401 to the battery-connected operate winding of the thousands register THR to operate the digit register.

When line relay 402 comes to rest, operated, at the end of any series of digit impulses, series relay 407 shortly thereafter restores, responsive to the continued open-circuit of its operate circuit, and at its break contacts closes the chain relay circuit.

When the impulses of the thousands digit or verification digit are delivered to the operate winding of thousands register THR, the contact sets 1 to 10 of this register are actuated successively, responsive respectively to the impulses of the digit.

On receipt of the first impulse, thousands register THR at its break contacts 1, disconnects the idle-indicating battery potential (if provided) from the sleeve conductor of the associated trunk and at its make contacts 1 prepares for absorbing the initial digit "1" if no more pulses are forthcoming.

Incoming thousands seelctor 400 is arranged to absorb the initial digit "1" as many times as dialed or otherwise produced as by improper hookswitch operation or by line trouble. Accordingly, the digit "1" is unassignable as an effective thousands digit.

When the thousands digit dialed contains only a single impulse, the first contact set is the only one operated on the thousands register THR. Then, when series relay 407 restores, as described, at the end of the digit registration, ground potential from back contacts of series relay 407 is extended through break contacts 4 of busy relay 406 and break contacts 7 of cutoff relay 401, make contacts 1 and break contacts 2 of thousands register THR, current limiting resistor 413 and the lower or lease winding of thousands register THR to battery potential. The current flow through the lower winding of thousands register THR neutralizes the residual holding flux of the thousands register THR and it consequently restores. When the thousands register THR restores, its contacts 1 open its restoring circuit and prepares it to receive dial impulses again.

The first stepping impulse which is delivered to the thousands register THR is also delivered to the battery-connected winding of series relay 407, as noted. Series relay 407 operates and at its make contacts, extend ground potential to the battery-connected winding of the off-normal relay 405. Relay 405 operates and locks to ground on locking wire 422 through its make contacts 4. Make contacts 3 of off-normal relay 405 prepare the release circuit of thousands register THR for normal clearout, as will hereinafter be described; break contacts 1 open the dial-tone lead (if connected) to prevent reapplication of the dial tone to the calling line; and break contacts 2 open the battery supply lead extending to the sleeve conductor to prevent seizure of the selector by locally-originated calls.

At the end of the dialing of the first digit, the line relay 402 comes to rest, operated, and release relay 403, release auxiliary relay 404, and off-normal relay 405 are maintained operated, along with the setting of the register THR.

When series relay 407 restores on completion of the dialing of the thousands digit, its break contacts extend ground potential on wire 431 through break contacts 4 of busy relay 406, break contacts 7 of cutoff relay 401, make contacts 1 and 2 of thousands register THR to one side of the winding of chain relay 408. If a battery-supply circuit is complete to the chain-end wire from break contacts 6 and 5 of chain relay 408, chain relay 408 operates. The operation of the chain relay 408 from the battery-potential appearing on the chain-end wire is as described with reference to the corresponding selector in the noted Hutton et al. application.

Responsive to the operation of the chain relay 408, the selector chain is seized and is guarded against seizure by any other selector in the same section by locking itself at its make-first contacts to the associated chain-end wire and by isolating the chain-out wire from the chain-in wire of the next selector.

Responsive to the dialing of the thousands digit of the directory number of a desired line, chain relay 408 operates and at its make contacts 8, grounds the selected one of the digit wires D2 to D10 extending to the selector controller 500 over conductors in cable S400.

The thousands selector switch TSS–1 and the selector controller 450 of Fig. 4, part 2, are assumed to be similar to the respective switch and controller of the noted Hutton et al. application except for the two busy verification leads BV–1 and BV–2, originated in selector 400. The purpose of these leads will be described in detail hereinafter with reference to the toll verification call operation.

As described in the noted Hutton et al. application, ground potential on one of the digit wires D2 to D10 causes operations to occur in the selector controller for selecting an idle trunk extending to the next switching stage.

In the event that all the trunks in the called level are busy, ground appears on the busy wire BU and operates busy relay 406 which locks operated through its make contacts 3. Contacts 1 of relay 406 extends busy tone from wire BT to the calling line. Break contacts 2 of busy relay 406 open the pulsing circuit of the thousands register THR and break contacts 4 thereof open the release circuit of the chain relay, thereby permitting the seized selector controller 450 to be returned to common use.

In the event there is an idle trunk in the called trunk level corresponding to the thousands digit dialed, the selector controller 450 controls the selector switches in extending the calling line through selector 1100 to a trunk such as TRK1 extending to the next stage, in a manner described in the related Hutton et al. application.

Assuming all trunks extending to the hundreds selector stage are busy, excepting the last, selector controller 450 operates hold magnet HM–10 to extend a connection from selector 400 to selector 500 by closing the contacts at the intersection of horizontal H–12 and vertical V–12 of switch TSS–1. Selector 500 is seized and ground is returned on the sleeve conductor thereof. The calling toll connection is now extended to selector 500 through repeater 350 and selector 400 by way of the last-choice trunk TRK–10.

Relay 401 operates from the hold magnet operate ground on the sleeve conductor to release line relay 402 and transmit ground (on verification calls) on wire 421 ahead to the seized selector.

Line relay 402, release relay 403, release auxiliary relay 404, chain relay 408, and relays 409 and 410, if operated, restore. With the restoration of chain relay 408, the initial operate circuit of cutoff relay 401 is opened, but cutoff relay 401 does not restore at this time as it is held operated in series with the upper winding of off-normal relay 406 to the noted ground appearing on the sleeve conductor S of the attached trunk.

Cutoff relay 401, off-normal relay 405, and register THR are the only apparatus operated in the selector during conversation.

Responsive to disconnect by the toll operator, ground is removed from the sleeve conductor S as will be described with reference to the clearing out of connector 600 and selector 400 is returned to an idle condition. Cutoff relay 401 restores and off-normal relay 405 restores a short time later, it being slow-restoring because of the indicated copper sleeve under its winding.

With the restoration of cutoff relay 401, ground from the back contacts of line relay 402 is extended through break contacts 3 of release auxiliary relay 404, back contacts 6 of cutoff relay 401, make contacts 3 of yet-operated off-normal relay 405, break contacts 2 of release auxiliary relay 404 and current-limiting resistor 413, to the battery-connected restoring winding of thousands register THR. Thousands register THR restores and the selector is then completely cleared out. If provided, idle-indicating battery potential reappears on the sleeve conductor of the associated trunk, marking selector 400 idle.

IIIA3. *Special hundreds selector 500* (Fig. 5)

As shown in Fig. 5 of the drawings, a special hundreds selector 500 is shown in partial detail and a regular hundreds selector 1500 is shown as a dotted rectangle.

It is assumed that selector 500 is similar to the hereinbefore described selector 400 excepting that the busy verification relays 509 and 510 of selector 500 correspond to relays 409 and 410 of selector 400. The operation of these relays will be described in detail hereinafter.

Hundreds selector 1500 is assumed to be similar to selector 1400 of Fig. 4, part 1, except that it preferably does not apply dial tone upon being taken for use.

A hundreds selector switch HSS–1 and an associated selector controller 550 are partially illustrated, these items of apparatus being assumed to be similar to the thousands selector switch TSS–1 and selector controller 500 of Fig. 4, part 2.

Selectors 500 and 1500 are combined toll and local selectors in that either may be included in the switch train of a toll call or a local call. As will be described hereinafter, selector 500 when used in a toll verification switch train exercises special control over the selector controller to direct the call and to transmit verification marks forward to the next switching stage. As noted for selector 400, only one special selector 500 is served by switch HSS–1, the remaining selectors being assumed similar to selector 1500.

IIIA3*a*. *Selector 500 operation*

Responsive to the extension of a connection from incoming thousands selector 400 through the associated horizontal and selected vertical on the thousands selector switch TSS-1, the closed line loop is extended through break contacts 1 and 2 of cutoff relay 501, and the differentially-connected windings of the busy verification relay 510, to the battery and ground connected windings of line relay 502.

Line relay 502 operates, and as hereinbefore described with reference to incoming thousands selector 400, release auxiliary relay 504 thereafter operates and prepares selector 500 for receipt of the dial impulses. Relay 510 does not operate as the current flow therethrough is equal and in opposing relationship. At such time, responsive to the operation of the release auxiliary relay 504, make contacts 5 and 6 thereof short-circuit the windings of the relay 510, effectively removing it from the dialing circuit.

The toll operator dials the hundreds digit of the desired subsriber and such digit is registered on the usual hundreds register (not shown). Upon completion of the dialing, such digit indication is transmitted to selector controller 550 over conductors in cable group S500 to cause operations to take place, as hereinbefore noted with respect to selector controller 450, to extend the connection to the combined toll and local connector 1700 or to the special combined toll and local connector 700, depending upon the busy condition of the regular combined connectors.

Assuming all connectors to be busy, excepting the one assigned to vertical V-10 of hundreds selector switch HSS-1, the connection is thereupon extended to the special combined toll and local connector 700, by operation of selector switch HSS-1.

The seizure of the common control apparatus by selector 500, the switching-through operations, and the clear-out operations of selector 500 are as hereinbefore described with reference to selector 400.

IIIA4. *Special connector 600*
(Fig. 6, parts 1 and 2)

Referring now to Fig. 6, parts 1 and 2 of the drawings, it will be observed that two connectors are shown thereon. The special combined toll and local connector 600 is shown in complete detail and the combined toll and local connector 1600 is indicated only by a dotted rectangle. Connector 1600 is assumed to be similar to connector 600 excepting that it preferably does not have the corresponding busy verification relay 705 and the differential relay 702. Connector 600 is a modification of the connector of the noted Hutton et al. application and accordingly, the common control wires extending to the connector controller 700 are as described therein.

Only one special connector 600 is provided to serve any 100-line group, the remaining connectors of such group assumed to be similar to connector 1600.

IIIA4a. *Circuit functions of connector 600*

Connector 600 handles both locally originated and toll originated calls which are received over its assigned vertical on the hundreds selector switch HSS-1. Special combined toll and local connector 600 performs the following principal circuit function:

(1) Normally, it supplies idle-indicating battery potential to the sleeve conductor of the attached hundreds trunk to indicate its busy or idle condition;

(2) Upon seizure it removes the idle-indicating battery potential and substitutes a holding potential therefor;

(3) It receives and stores three digits, two of which are transferred to the connector controller 800 to control the extension of a connection to a desired line;

(4) It temporarily seizes the chain circuit of its connector section, subject to such chain being idle, and thereafter guards the seized chain against seizure by any other connector in the same section;

(5) It transfers the two digits of stored digit information to the connector controller while it has the chain seized;

(6) Upon a signal that the called line is busy, it applies busy tone to the calling line and frees the seized chain;

(7) When the call is answered, it trips the ringing circuit; completes the talking connection; and reverses the current flow over the tip and ring conductors of the attached hundreds trunk;

(8) It supplies transmitter current to both lines;

(9) Upon disconnect by the calling and called lines it clears out and releases the entire connection by removing holding ground from the incoming sleeve; and

(10) It provides discrimination to determine whether the call is a toll or local call.

Connector 700 being a combined toll and local connector may be arranged to provide both permanent and conversation timing (not shown herein), the conversation timing being disabled in the normal way responsive to the connection being a toll connection.

IIIA4b. *Relay functions of connector 600*

The eighteen relays 601 to 618 of connector 600 have principle functions assigned thereto as follows:

Relay 601 (Reverse Battery) operates responsive to called party answer and reverses the incoming and tip conductors to provide any desired supervisory function;

Relay 602 (Differential) is operated from a momentary pulse of ground appearing on the ring conductor to mark the call as a verification call, and is short-circuited shortly thereafter to improve dialing conditions;

Relay 603 (Line) supplies transmitter current to the calling line; operates when the connector is seized; and restores thereafter under control of the calling device or hookswitch whenever the calling line loop is opened;

Relay 604 (Back Bridge) operates over the called line when the call is answered to operate the reverse-battery relay and to supply transmitter current to the called line;

Relay 605 (Busy Verification) operates from the differential relay and locks operated to mark the call as a vertification call in order to condition connector 600 to cut-in on the busy line;

Relay 606 (Release) is slow-releasing by virtue of a copper sleeve under its winding; is operated by the line relay; and remains operated during pulsing, but releases when the line relay remains restored for a substantial fraction of a second;

Relay 607 (Release Auxiliary) is operated by the release relay and aids in the performance of the release relay functions;

Relay 608 (Discriminating) operates on local calls to mark the connector;

Relay 609 (Discriminating Auxiliary) is operated by the discriminating relay on local calls to disable the busy verification relay;

Relay 610 (Ring Cutoff) is operated when the called line answers to disconnect the called line from the ringing current supply;

Relay 611 (Ring Reverse) is operated when the station digit dialed corresponds to the second station on the line, thereby causing ringing current to be applied to the other side of the line for divided ringing;

Relay 612 (Ring Trip) is slow-operating by virtue of the copper collar surrounding the armature end of its core and is operated by the direct current flow in the ringing circuit when the call is answered, to open the ringing circuit and to close the talking circuit;

Relay 613 (Chain) is operated when the stations digit has been dialed; seizes the chain of the local connector section for the exclusive use of this connector, subject to the chain being idle;

Relay 614 (Busy) is operated if the called line is busy to apply busy tone signals to the calling line;

Relay 615 (Test) operates when the called line is idle to "cut-through" the tip and ring conductors of the calling line to the tip and ring conductors of the called line;

Relay 616 (Series) is operated by the line relay; is slow-restoring by virtue of a copper sleeve under its winding; and it remains operated during pulsing but restores when the line relay remains restored for a substantial fraction of a second;

Relay 617 (Series Auxiliary) is operated by the series relay and aids in the performance of the function of the series relay; and Relay 618 (Off-Normal) operates when any one of the counters is operated and remains operated until all counters are restored.

The three impulse counters, the combined sequence and stations counter SEQ, the tens register TR, and the units register UR of connector 600 have principal functions assigned thereto as follows:

Impulse counter SEQ (Sequence and Stations Counter) operates at the end of each digit series of impulses to distributes such series to registers TR and UR and to record the stations digit dialed;

Impulse counter TR (Tens Register) registers the number of impulses in the tens digit; and Impulse counter UR (Units Register) registers the number of impulses in the units digit.

Sequence device SEQ, which actuates its contact set 1 on receipt of the first operating pulse, disconnects resistor 619 as a sleeve-guarding measure and completes an operate circuit for the off-normal relay 618.

IIIA4c. *Connector 600 operation*

The detailed operation of connector 600 will now be given. As noted, connector 600 is seized by the closure of the calling line loop through selector switch HSS–1 to the tip, ring, and sleeve conductors of the attached trunk to the battery and ground connected windings of line relay 603. Relay 603 operates and closes an operate circuit for release relay 606.

Release relay 606 operates and at its contacts 1 extends ground to one side of relay 608; at its contacts 2 and 4 short-circuits relay 602; and at its contacts 3 closes an operating circuit for release auxiliary relay 607.

Release auxiliary relay 607 operates and at its contacts 1, removes the idle-indicating battery potential from the sleeve conductor and places ground potential thereon through the winding of discriminating relay 608; its contacts 2 ground the ring-start wire RI–ST, starting the common ringing apparatus into operation if it is not already operating; its contacts 4 lock relay 605 operated if the call is a verification call; its contacts 5 prepare an operate circuit for ring-cutoff relay 610; its contacts 6 ground common locking wire 636; its make contacts 7 ground common locking wire 626; and its contacts 8 prepare a release circuit for sequence counter SEQ. If the call were from a local subscriber, the battery from the cutoff relay of the calling line circuit would operate discriminating relay 608 which at its contacts, operates relay 609. The operator, projecting ground forward from repeater 350, however, short-circuits relay 608 preventing it from operating. Connector 600 is now prepared to receive dial impulses.

The seizure of the connector is accomplished during the interdigit period and immediately following the dialing of the hundreds digit of the directory number, the tens, units, and stations digits are dialed in succession.

Each time the calling device (not shown) is operated to transmit a series of circuit-interruption impulses constituting the tens, units, and stations digits, line relay 603 is restored momentarily for each such interruption impulses in a series, comprising from one to ten impulses, depending upon the digit dialed.

Release relay 606 and release auxiliary relay 607 remain operated throughout any series of impulse-induced restorations of line relay 603.

Series relay 616 operates promptly upon the first restoration of line relay 603, its operate circuit being from the back contacts of relay 603, break contacts 3 of relay 604, make contacts 8 of release auxiliary relay 607, wire 625, break contacts 4 of sequence counter SEQ, wire 632, and break contacts 3 of series auxiliary relay 617 to the battery-connected winding of series relay 616. Upon operating, series relay 616 locks operated independent of contacts 3 of series auxiliary relay 617. At its make contacts 1, relay 616 completes an operate circuit for auxiliary relay 617 from the ground on grounded wire 636.

Series auxiliary relay 617 operates; its make contacts 3 open the initial operate circuit of the series relay 616; and its contacts 1 prepare an operate circuit for advancing sequence counter SEQ.

With release auxiliary relay 607 maintained continuously operated, each restoration of line relay 603 delivers an impulse at its break contacts to pulse wire 625 extending through break contacts 4 of sequence counter SEQ to pulse wire 632, as noted. These ground impulses are transmitted to the operate winding of the tens register TR through break contacts 2 of the sequence counter SEQ and also maintain series relay 616 operated.

When line relay 603 comes to rest, operated, at the end of any digit series of impulses, series relay 616 restores after a slight delay and opens the operate circuit of relay 617 which restores sequentially a short time later. At such time when series relay 616 is restored and series auxiliary relay 617 is yet operated, the ground appearing on wire 636 is extended through break contacts 1 of relay 616 and make contacts 1 of relay 617, to deliver a stepping impulse to sequence counter SEQ.

This stepping impulse which is delivered to device SEQ at the end of the receipt and registration of the tens digit, causes both its contact sets 1A and 1B to shift to their alternate positions. Make contacts 1A close an operate circuit for off-normal relay 618; break contacts 1A disconnect idle-indicating battery from wire 633 to prevent the reapplication of idle-indicating potential to the incoming sleeve conductor of the connector; break contacts 1B disconnect the incoming impulse wire 632 from the tens register TR; and make contacts 1B transfer such pulsing wire to the operate winding of units register UR.

Responsive to the dialing of the units digit of the called directory number, a series of circuit interruption impulses are transmitted over pulsing wire 625 and are extended through break contacts 4 and make contacts 1B of counter SEQ to the battery-connected winding of units register UR. At the same time, these circuit-interruption impulses are transmitted to series relay 616 which operates as noted and operates series auxiliary relay 617. The contact sets 1 to 10 of register UR are actuated successively, responsive respectively to the impulses constituting the units digit.

When line relay 603 comes to rest, operated, at the end of the dialing of the units digit, series relay 616 restores after a slight delay and thereafter restores series auxiliary relay 617, as noted. A second stepping impulse is thereupon delivered to the winding of sequence device SEQ from the ground on conductor 636 causing it to shift its contact set 2 to its alternate position, which opens the operate circuit of units register UR and transfers the pulsing wire 625 to wire 638 extending to the winding of counter SEQ.

Responsive to the restoration and reoperation of the line relay according to the impulses of the stations digit, ground impulses are transmitted over wire 625 and 638 through contacts 2, 3, and 4 of device SEQ to the operate winding of sequence device SEQ. At the same time, series relay 616 operates, followed thereafter by the operation of relay 617. The make contacts on relay 616 maintain the operate circuit of sequence device SEQ closed while dialing the stations digit.

The stations digit comprises one or two impulses depending on whether the called party is on the tip or ring side of the called line. Therefore, responsive to the dialing of the stations digit, sequence device SEQ operates its contacts 3 or 4 depending on whether stations digit "1" or digit "2" were dialed. Assuming that the digit "2" is dialed, the sequence device actuated its contact sets 3 and 4 responsive to the two impulses of the dialed digit.

Responsive to the end-of-dialing stepping impulse delivered over wire 636, sequence device SEQ actuates its contact set 5 which shifts to its alternate position, thereby connecting wire 628 to wire 637.

Shortly after the third stepping impulse from wire 636 is delivered to the operate winding of sequence device SEQ, relays 616 and 617 restore and the ground on wire 636 is extended to wire 637 which is connected to the battery-connected winding of the ring-reverse relay 611 through SEQ contacts 5, wire 628, and make contacts 3 of relay 611. At the same time, ground on wire 637 is extended through make contacts 4 of device SEQ to wire 629 extending to one side of the chain relay 613 through break contacts on the busy relay and the test relay.

Ring-reverse relay 611 operates and locks through its make contacts 3 to the grounded conductor 636, and at its make contacts 1 and 2 transfer the generator-ground wire GEN–GRD from the ring conductor of the called line to the tip conductor in preparation for signalling the called station on the tip conductor of the line.

As noted hereinbefore with reference to selectors 400 and 600, battery from the chain-end wire completes an operate circuit for the chain relay providing the associated controller is idle and no other connectors have their chain relays operated.

With line relay 603, release relay 606, release auxiliary relay 607, and ring-reverse relay 611 operated, sequence device SEQ in position 5, and the tens and units registers TR and UR set according to their respective registered digits, an operate circuit is closed for the chain relay, which operates provided the chain is idle, as noted in the Hutton et al. application.

Contacts 3 and 4 of chain relay 613 prevent any interference by other connectors associated with controller 600 and renders controller 600 individual to the calling connector. Make contacts 1 prepare an operate circuit for busy relay 614 in the event that a P. B. X number has been called and no lines are idle; its break contacts 2 open the operate circuit of the ring-trip relay to prevent its operation until such time that the called line may have been tested; its make contacts 5 and 6 ground conductors 630 and 631 extending to the tens and units registers TR and UR, thereby grounding the selected one of the tens digit wires and the units digit wires extending to the connector controller and connector switches; and its make contacts 7 connect the secondary-off-normal wire SON to the hold magnet operate wire HM–OP to operate the associated vertical hold magnet to extend the connection to the called line.

Assuming that the called line was reached by dialing "012" in the connector (tens digit "0," units digit "1," and stations digit "2"), the tens register TR connects grounded wire 630 to tens wire T–0 and the units register UR connects grounded wire 631 to units wire U–1. The ground appearing on the selected tens and units digit wires is extended to the connector controller and connector switch over conductors in cable C600 thereby causing the tip, ring, and sleeve conductors of the calling connector to be extended to the tip, ring, and sleeve conductors of the called line by operation of the connector controller, as described in the noted Hutton et al. application.

When the hold magnet associated with the vertical terminating the calling connector operates, it locks operated through its off-normal contacts to the grounded locking conductor L and at other off-normal contacts ground busy wire BU.

At the time that such hold magnet operates and closes its off-normal contacts, the sleeve conductor of the called line is extended to one side of the upper winding of test relay 615, the other side of such winding being connected to ground potential on wire 626 through break contacts 3 of busy relay 614 and rectifier 623. Rectifier 623 prevents the ground on wire 626 from being projected forward on the sleeve conductor so that the cutoff relay associated with the calling line will not be operated prematurely.

Assuming the called line to be idle, the battery potential from the battery-connected winding of the cutoff relay of called line causes current flow through the upper winding of test relay 615. Relay 615 operates and locks operated through its lower winding and make-first contacts 7; its make contacts 4 ground the sleeve conductor S to operate the cutoff relay of the called line to prevent answer by the called line from causing line finding action to take place; its break contacts 4 release busy verification relay 605, if operated; its contacts 2 and 3 connect the battery and ground connected windings of the backbridge relay 604 to the tip and ring conductors of the called line; its make contacts 1 apply ring-tone from conductor RT through tone-coupling condenser 622 to the tip conductor of the calling line, thereby signalling that ringing has started; its break contacts 5 open the operate circuit of the busy relay from the grounded busy conductor BU; its contacts 6 connect generator-battery lead GEN–BATT to the ring conductor of the called line in series with the winding of ring-trip relay 612; and at its contacts 8 free the seized chain, thereby restoring the chain relay 615; freeing the connector controller for use in extending other calls.

Responsive to the restoration of chain relay 615, its break contacts 2 complete the ringing circuit, and ringing current is applied between the tip conductor and ground to signal the desired party; its make contacts 5 and 6 remove the ground from the digit wires; and its make contacts 7 open the initial operating circuit of the hold magnet associated with the calling connector. The hold magnet is now held operated from the ground on sleeve conductor S.

Assuming that the called line is busy, the sleeve conductor of the called line has ground potential thereon from the connector in use and this ground appears on the sleeve conductor short-circuiting the upper winding of test relay 615, preventing its operation.

Responsive to the failure of test relay 615 to operate, after a slight delay, the ground potential on the busy lead BU, originating at the off-normal contacts of the operated hold magnet, is extended through break contacts 5 of the unoperated test relay to the battery-connected winding of slow-operating busy relay 614.

Busy relay 614 operates, and at its contacts 1 applies busy tone to the calling line through the tone-coupling condenser 622. Its make contacts 2 locks it operated to the ground potential at make contacts 3 of release auxiliary relay 607. Break contacts 3 of the busy relay open the operate circuit of the upper winding of test relay 615 and at break contacts 4 free the chain, thereby releasing the common equipment.

Responsive to the receipt of busy tone, the connection is released and the connector and preceding apparatus are restored to normal, unless the call is a verification call, such operation being described hereinafter.

Ring-trip relay 612, whose winding is included in the ringing circuit does not operate before the call is answered for each ringer (not shown) on the called line has the usual condenser in series therewith to block direct-current flow and because the shading collar surrounding the armature end of the core, keeps it from responding to the alternating ringing current.

In order to permit ring-trip relay 612 to be operated by direct-current flow during the application of ringing current (if the call is then answered) the applied frequency of ringing current is in series with (superimposed upon) the exchange battery.

When the call is answered at the called station on the called line, the closure of the usual talking bridge across the called line causes direct-current flow thereover from the generator battery lead GEN–BATT, operating ring-trip relay 612. Relay 612 closes its make contacts to apply ground potential to the battery-connected winding of ring-cutoff relay 610.

Ring-cutoff relay 610 operates and at its make-break contacts 1 disconnects ringing tone from the calling line; its make contacts 2 and 3 transfer the tip and ring conductors of the called line from the ringing current and extends the talking bridge across the ground and battery connected windings of back-bridge relay 604, thereby supplying transmitter current to the called line; its break contacts 4 restore ring-reverse relay 611 and its make contacts 5 lock ring-cutoff relay 610 operated to the ground on locking conductor 626. Ring-trip relay 612 restores, its operate circuit being opened by contacts 2 and 3 of restored ring-cutoff relay 610.

The transmitter current flow through the windings of relay 604 cause it to operate. Contacts 1 of relay 604 remove the ground from the ring-start wire RI–ST; its contacts 2 close an operate circuit for reverse-battery relay 601; and at its break contacts 3 opens the pulsing wire 625.

Relay 601 operates and at its contacts 4 maintain an additional ground on locking conductor 626, rendering the connector last-party release. Its contacts 1 and 2 reverse the tip and ring conductors of the calling line, performing any required supervisory function, and at its contacts 3 open the idle-indicating battery supply wire.

During conversation the following relays of connector 600 are operated:

(1) Reverse-battery relay 601
(2) Line relay 603
(3) Back-bridge relay 604
(4) Verification relay 605 (verification call)
(5) Release relay 606
(6) Release auxiliary relay 607
(7) Discriminating relays 608 and 609 (subscriber call)
(8) Ring-cutoff relay 610
(9) Test Relay 615
(10) Off-normal relay 618

Additionally, the three counters SEQ, TR, and UR are held operated by residual magnetism.

Responsive to disconnect by both the calling and called parties, connector 600 is cleared out.

Assuming the calling operator disconnects, the opening of the line loop across the tip and ring conductors restores line relay 603 which restores relays 606 and 607 sequentially. Wire 626 remains grounded at make contacts 4 of reverse-battery relay 601 thereby maintaining relays 601, 604, 610, and 615 locked operated.

When the called line thereafter disconnects, back-bridge relay 604 restores and restores reverse-battery relay 601. With the restoration of relay 601, ground is removed from locking wire 626 and all operated relays restore with the exception of off-normal relay 618 which is maintained operated by contacts 1 of the counters, the counters being held operated by residual magnetism.

At the time when all relays are restored excepting off-normal relay 618, which is maintained operated by contacts 1 of any of the impulse counter devices, a clearout circuit for all counters is prepared.

Ground potential from break contacts of the line relay 603 is extended to wire 627 through break contacts of relays 604 and 607. This ground is further extended through the back contacts 2 of relays 615 and 610, break contacts 1 of ring-reverse relay 611, the winding of ring-trip relay 612, break contacts 2 of chain relay 613, break contacts 6 of test relay 615 to wire 635 from whence it is extended through make contacts 2 of off-normal relay 618 to battery through the restoring windings of the counters SEQ, TR and UR in series. The magnetic flux generated by the current flow through the restoring windings is in opposition to the residual magnetism, thereby each counter restores.

Responsive to the restoration of each of the magnetic impulse counters, the operate circuit of the off-normal relay 618 is opened, restoring it. With the restoration of the off-normal relay 618, the knock-down or restoration circuit of the counters is opened at contacts 1 and resistor 619 is again connected to wire 633.

Responsive to the dialing of the tens and units digit of the called line, connector 600 exercises control over connector controller 700 of Fig. 7 to cause the calling connection to be extended to the called line.

Connector controller 700 of Fig. 7 is similar to connector controller 1700 of the noted Hutton et al. application and responds to control from connector 600 to operate connector switch CS–1 to close the contact sets at the intersection of the horizontal terminating the called line and the vertical terminating connector 600.

Responsive to switch CS–1 operation, the calling line is connected to the called line over its hereinbefore traced circuit path to connector 600 and is connected to the selected call line through the contact bank of connector switch CS–1 and through horizontal H1 to the called line 2001.

As hereinbefore noted, the off-normal contacts 2 on the operated hold magnet locks the hold magnet operated to the lock lead L and its off-normal contacts 1 ground the busy wire BU. This ground on the busy wire BU operates the connector busy relay if the called line is busy, as noted.

Responsive to the operation of the hold magnet such as HM–1 in connector switch CS–1, ground potential from the sleeve conductor of the trunk extending to the connector is extended forward to operate the cutoff relay of line circuit LC–2001 of the called line 2001. Contacts 1 and 2 of cutoff relay 1326 open the operate circuit of line relay 1325 to prevent line-finding action, responsive to answer by the called party.

The line switch containing the called line, the thousands selector switch, and the hundreds selector switch are held operated from ground on the incoming sleeve of connector 600 if the call is a local call, or by ground from the sleeve conductor of the calling toll connection if the call is a toll call. The connector switch CS–1 and the cutoff relay of the called line circuit are held operated from ground projected forward from connector 600.

Responsive to answer by the called party, the calling toll operator may converse with the called subscriber served by line 2001. Upon completion of a call, disconnect by the calling and called lines, clears out the apparatus involved in extending the described connection.

IIIB. *Locally-originated call*

The operations involved in making a locally-originated call from a local line to another local line in the disclosed multi-thousand exchange will now be described with reference to Figs. 3 to 7.

IIIB1. *Initiation of call*

When the receiver (not shown) is removed at calling station S1 of line 2000 (Fig. 3), the usual direct-current bridge is closed across the tip and ring conductors L1 and L2 of line circuit LC–2, thereby operating line relay 325 through break contacts 1 and 2 of cutoff relay 326.

Line relay 325 operates and at its make contacts 1 and 2, grounds the fives relay wire and the units wire to cause the common control apparatus of the line controller (not shown) of the noted Hutton et al. application to control line switch LS–2 to operate hold magnet HM–1 to extend the connection to an idle thousand selector. In order to control line switch LSM2 to select an idle trunk extending thereto and seize the associated selector, a test circuit, including idle-test wire IT extending to the sleeve conductor S of the associated thousands selector 1400, is established and a selector such as selector 1400 is seized.

Responsive to the seizure of an idle selector, contacts on the release relay thereof return ground potential on the sleeve conductor of the selected trunk, maintaining the concerned hold magnet (in this instance, hold magnet HM–1) operated after the common equipment has been cleared out. This ground potential is further extended to the battery-connected winding of cutoff relay 326 of the calling line circuit LC–2. Cutoff relay 326 operates and at its contacts 1 and 2, restores line relay 325. With the restoration of line relay 325, ground potential is removed from the grounded conductors, returning the common control equipment to common use.

The calling line is now connected to an idle thousands selector 1400 and dial tone is returned.

IIIB2. *Thousands selector 1400*

As hereinbefore pointed out, thousands selector 1400 is assumed to be similar to incoming thousands selector 400 excepting that it does provide dial tone when taken for use and that the busy verification relays 409 and 410 are omitted.

When thousands selector 1400 is seized by the described extension of a connection thereto from calling line 2000, ground is returned on the sleeve connector and dial tone is returned to the calling line. The calling line thereupon dials the thousands digit of the directory number which is recorded and later transmitted to the associated selector controller. As pointed out in the Hutton et al. application, the thousands selector switch TSS–1 is operated to close the contacts at the intersection of the horizontal H1 terminating the calling selector and a vertical associated with an idle trunk, in this case assumed to be associated with vertical V1. The test circuit for determining the busy or idle condition of a trunk extending to the hundreds selector stage is determined by testing the sleeve conductors thereof.

When one of the trunks extending to the hundreds selector stage is idle, the selector controller 450, assumed to be similar to the selector controller 1300 of the noted Hutton et al. application, selects such a trunk and completes an operate circuit for the hold magnet associated therewith. The concerned hold magnet operates and extends the calling line 2000 through closed contacts on the thousands switch TSS–1 to the battery and ground connected windings of the line relay of the hundreds selector 1500, seizing it. As noted, selector 1500 is assumed to be similar to the special hundreds selector 500 except that it does not have the busy verification relays therein.

Responsive to seizure of hundreds selector 1500, ground is returned on the sleeve conductor S thereof to maintain operated the hold magnet on the thousands selector switch TSS–1, the cutoff relay of the thousands selector 1400, the hold magnet HM–1 of line switch LS–1, and the cutoff relay of the calling line circuit. At such time, selector 1400 is switched-through and the connection is completed to selector 1500 as hereinbefore described.

The switch-through and the release of selector 1400 is as described with reference to incoming thousands selector 400. The connection from the calling line to the selected hundreds selector 1500 is maintained from ground at the contacts of the release relay (not shown) of selector 1500.

IIIB3. *Hundreds selector 1500*

Hundreds selector 1500 is assumed to be similar to the special hundreds selector 500 except for differences hereinbefore pointed out.

When the hundreds selector 1500 is seized by the described extension of a connection from a calling line 2000 over the hereinbefore described path, the direct-current bridge across the tip and ring conductors of the conductors thereof seize the selector and cause ground to be returned on the sleeve conductor S thereof as hereinbefore noted. The dialing of the hundreds digit in the hundreds selector 1500 causes operations to take place to record such digit and to transmit such information to the selector controller 550 over conductors in cable group S500, to control the hundreds selector switch HSS–1 in extending the connection.

The operation of selector controller 550, being assumed similar to selector controller 450, in extending the calling line through the hundreds selector switch HSS–1 to an idle trunk extending to the connector switch frame containing connectors 1600, is as previously described with reference to selector controller 450. An idle connector, such as connector 1600, is now seized and ground is returned on the sleeve conductor S.

The hundreds selector 1500 receives ground from the sleeve conductor of seized connector 1600 and switches-through as hereinbefore noted.

The connection from the calling line is now held from ground potential from the release auxiliary relay 1607 (not shown) of connector 1600 and is extended rearwardly to hold operated the necessary equipment to maintain the talking path intact.

IIIB4. *Connector 1600*

When connector 1600 is seized by the described extension of a connection thereto, the closed bridge across the tip and ring conductors causes the line relay (not shown) to operate and, as hereinbefore noted with reference to connector 600, operate the other relays to return holding ground on the sleeve conductor. Following the seizure of the connector 1600, the tens, units and stations digit of the directory number are dialed and operations take place in connector 1600, similar to those described with reference to connector 600, to cause operations to take place in connector controller 1700 to extend the connection to the called line and to signal the called station thereon. The ringing, answering, disconnecting, and clearing-out is as described with reference to connector 600. Responsive to seizure of connector 1600 by a local line, discriminating relay 608 operates. Its operate path is from ground at contacts 1 of relay 606, the winding of relay 608, make contacts 1 of relay 607, the sleeve conductor of the extended connection, and battery through the winding of the cutoff relay of the calling line.

IIIC. *Toll verification call*

The operations inolved in making a toll verification call from a toll board TB to a local line in the disclosed multi-thousand exchange will now be described.

IIIC1. *Initiation of call*

When the toll operator at toll board TB desires to busy-verify a line, such as line 2001, connection is made to the incoming toll trunk in the usual manner and the connection is further extended to seize the incoming thousands selector 400 as hereinbefore described with reference to a regular toll call.

IIIC2. *Incoming thousands selector 400*

When incoming thousands selector 400 is seized, line relay 402, release relay 403, and release auxiliary relay 404 operate in the manner hereinbefore described.

Since the toll operator desires to busy-verify a line, the initial vertification digit is dialed, followed by the dialing of the thousands digit of the directory number of the line to be verified.

Assuming the initial busy verification digit to be the digit "6" this digit being unassignable as a regular thousands digit, the thousands register THR is actuated responsive to the ground pulses constituting the verification digit, as hereinbefore described.

On the completion of the dialing of the verification digit, series relay 407 restores and at its break contacts extends ground potential through break contacts 4 of busy relay 406, break contacts 7 of cutoff relay 401, and through make contacts 1 and 2 of thousands register THR to one side of the winding of chain relay 408, which operates and seizes the common control apparatus as hereinbefore described. Responsive to the operation of chain relay 408, make contacts 8 thereon extend ground potential through break contacts 7 and make contacts 6 of thousands register THR to one side of the battery-connected winding of busy verification relay 410 through break contacts 3 on relay 409.

Relay 410 operates and at its make contacts 3 closes an operating path for relay 409 in series with relay 410 when the ground is removed at contacts 8 of relay 408.

At such time, with ground potential from wire 422 appearing on one side of the winding of relay 409 and ground potential through break contacts 3 thereof appearing on the other side, relay 409 is short-circuited and fails to operate.

With relay 409 restored and relay 410 operated, ground potential from break contacts 4 of relay 409 is extended through make contacts 2 of relay 410 to the restoring winding of thousands register THR through current-limiting resistor 413.

Thousands register THR restores, thereby opening the chain circuit of chain relay 408, which restores a short time later and removes ground from the one side of relay 410. With ground potential from wire 422 appearing on one side of relay 409 through make contacts 3 of relay 410 to battery through the winding of relay 410, relay 409 operates in series with relay 410.

At such time, relays 409 and 410 are operated and locked independently of the thousands register. Contacts 1 and 2 of relay 409 ground wires 423 and 424 extending to make contacts 3 and 4 of chain relay 408. Make contacts 1 of relay 410 ground wire 421 extending to make contacts 3 of cutoff relay 401.

Selector 400 has marked the call as a verification call and the toll operator thereafter dials the regular thousands digit of the line to be verified.

Following the dialing of the thousands digit, the chain circuit is again closed and the common control apparatus is seized in the manner hereinbefore described. At such time, ground potential appearing on busy verification wires BV–1 and BV–2 is extended over conductors in cable group S400 to selector controller 450 to mark the selector controller that a verification call is in progress.

IIIC2*a*. *Selector controller 450*

As described with reference to the selector controller of the noted Hutton et al. application, selector controller 450 tests the idle trunks available to a calling selector to determine an idle path thereover. Ten test relays and one cutoff relay are provided (in this disclosure, relays 451 to 461) to test the trunks and control the associated switch to extend the calling connection. Responsive to the operation of any test relay, indicating an idle path, such relay locks operated independently of the cutoff relay and at make contacts 2, operates the cutoff relay to discontinue the test.

On verification calls, responsive to the seizure of the common control apparatus, the ground appearing on the busy verification wire BV–1 is extended directly to one side of the winding of the cutoff relay 451 which operates and disables all of the test relays 451 to 461 at its break contacts 1 to 10. At the same time, however, the ground appearing on the busy verification wire BV–2 is extended to one side of the winding of the last test relay 461, thereby marking the last trunk in the group as accessible by a calling selector.

In the event that the last trunk (trunk 10) is busy, the associated test relay 461 fails to operate and, as hereinbefore described, ground appears on the busy-tone wire BU to operate busy relay 406 and to return busy tone to the calling line.

In the event that the trunk 10 is idle, the battery potential from the current-limiting resistor 512 is extended over the sleeve test wire ST–10 through controlling contacts in the selector controller (not shown) to one side of the winding of test relay 461, the other side being connected to the grounded busy verification wire BV–2.

Test relay 461 thereupon operates and locks operated through contacts not shown, in the manner described in the noted Hutton et al. application. Contacts 1 thereon extend ground potential from the now grounded secondary-off-normal wire SON to the magnet wire M–10 extending to hold magnet HM–10 associated with the vertical terminating the selected trunk, this operation being as hereinbefore described in the noted application.

Responsive to the operation of hold magnet HM–10, which operates and locks operated through its make contacts 2 to the ground appearing on the sleeve conductor of trunk 10 responsive to seizure of special hundreds selector 500, the connection from the calling toll operator is now extended through toll repeater 350, incoming thousands selector 400, horizontal H–12 and vertical V–10 of thousands selector switch TSS–1, and trunk 10 to the special hundreds selector 500.

Responsive to the operation of the hold magnet, its operate ground is extended through its make contacts to the sleeve conductor and cutoff relay 401 of selector 400 operates in the manner hereinbefore described. Contacts 3 of relay 401 extend the ground on wire 421 to the ring conductor R of the selected trunk 10 through contacts on the selector switch to the special hundreds selector 500. This ground appears only momentarily, as responsive to the operation of cutoff relay 401, release auxiliary relay 404 restores as hereinbefore noted on clearout, thereby restoring busy verification relays 409 and 410, removing ground from the ring conductor of the seized trunk. This momentary appearance of ground on the ring conductor serves as a verification mark to mark special selector 500 that the call is a verification call, such operation being described with reference to the special hundreds selector 500 on verification calls.

IIIC3. *Special hundreds selector 500*

Responsive to seizure of the special hundreds selector 500 by the described extension of a connection thereto, the closed line loop is extended to the battery and ground connected windings of line relay 502 through the upper and lower windings of busy verification relay 510. Busy verification relay 510 has its windings differentially connected and the magnetic flux generated in either winding is equal and opposite to the flux generated in the other winding, thereby relay 510 fails to operate. Line relay 502 operates and, as hereinbefore described, operates release relay 503 and release auxiliary relay 504. Responsive to the operation of the release relay, ground is returned on the sleeve conductor S thereof to cause the preceding incoming thousands selector 400 to switch-through.

As hereinbefore pointed out on verification calls, a momentary pulse of ground appears on the ring conductor of the extended connection, this ground short-circuiting the upper winding of the busy verification relay. The differential balance of the windings of busy verification relay 510 is upset and relay 510 operates. Make contacts thereon extend ground potential to the battery-connected winding of busy verification relay 509. A short time later release auxiliary relay 504 operates and at its contacts 5 and 6 short-circuits relay 510 to improve dialing.

Busy verification relay 509 operates and at its make contacts 3 and 4 grounds conductors 623 and 624 which, responsive to chain relay operation, extends to the busy verification wires BV–1 and BV–2. At the same time, contacts 1 of relay 509 ground conductor 621 extending to make contacts 3 of the cutoff relay 501.

Responsive to the dialing of the hundreds digit assigned the directory number of the line to be verified, the hundreds register (not shown) operates and causes the common control apparatus to be seized responsive to the operation of the chain relay 508. At such time, ground potential is extended on the busy verification wires BV–1 and BV–2 extending to the selector controller 550, such controller being similar to the selector controller 450 of Fig. 4, part 2.

Selector controller 550 responds to control received over conductors in cable group S500 and as hereinbefore described, controls the last test relay thereof to cause a connection to be extended over the last choice trunk in the called trunk group, in this case being trunk 10 extending to the special combined toll and local connector 600.

If such trunk is idle, the hold magnet wire HM–10 is energized, thereby operating hold magnet HM–10 which locks operated to the ground on the sleeve wire of the extended connection responsive to ground potential being returned thereover from the seized connector. At such time, cutoff relay 501 of the calling selector 500 operates and extends the ground potential on wire 621 to the ring conductor R to advance the verification mark forward, as hereinbefore pointed out.

IIIC4. *Connector 600*

Responsive to the extension of a connection over the selected trunk 10 extending to the special combined toll and local connector 600, connector 600 is seized in the manner hereinbefore described.

Responsive to the noted operation of the cutoff relay of the preceding selector, a momentary pulse of ground potential appears on the ring conductor, this ground upsetting the differential balance of relay 602 and causing it to operate.

Differential relay 602 operates and at its make contacts operates busy verification relay 605 which locks through its make contacts 4 to the ground on the sleeve conductor S.

Ground also appears on one side of discriminating relay 608, the other side thereof being connected to ground, and relay 608 fails to operate, it being short-circuited.

At such time, after the ground pulse appears on the ring conductor, release relay 606 upon operating short-circuits both windings of differential relay 602 at its contacts 2 and 4, to improve dialing.

Make contacts 2 and 3 of busy vertification relay 605 connect the calling extended connection, which includes condensers 620 and 621, to the tip and ring conductors extending to the called line, and at its break contacts 1 disconnects busy tone from the calling line.

Following the operation of release relay 606, release auxiliary relay 607 operates and locks the busy verification relay 605 operated under control of break contacts 4 of the test relay 615. The calling operator now dials the directory number of the line which is to be verified.

Responsive to the dialing of the tens, units, and stations digit of the desired line and station, operations take place as hereinbefore described to operate the hold magnet and extend the connection to the called line. At such time, the test relay tests the called line to determine its busy or idle condition.

In the event the called line is busy, test relay 615 fails to operate and busy relay 614 after a slight delay operates. Busy tone is not returned to the calling subscriber at this time as it is now opened at contacts 1 of busy verification relay 605. Break contacts 3 and 4 of busy relay 614 open the chain circuit, release the chain relay; and open the test relay circuit.

The operator is connected to the busy line, the talking path being through condensers 621 and 620, the make contacts 2 and 3 of operated busy verification relay 605, and the closed contacts on the connector switch to the called line.

In the event the called line is idle, test relay 615 operates as hereinbefore described and at its break contacts 4 restores busy verification relay 605 which reconnects the back bridge relay 604 to the tip and ring conductors of the called line in the normal manner. The called line is now signalled in the normal manner and the operator may talk to the called subscriber.

Responsive to disconnect by both parties, the connection is cleared out as hereinbefore described.

I claim:

1. In an automatic telephone system, first trunks, lines having respective usual telephone numbers assigned thereto, each line also having a verification telephone number comprising its usual telephone number with a common verification digit prefixed thereto, means for marking any line busy, automatic switching apparatus, means responsive to the transmission over any said trunk of the usual telephone number of any said line for operating the automatic switching apparatus to extend a usual connection from the calling trunk to the called line, means including busy-test means in the automatic switching apparatus for barring any usual connection to a called line which is marked busy, verification recording means selectively responsive to the transmission of the common verification prefix digit over a said trunk for recording that digit and for absorbing it as regards the numerical response of the automatic switching apparatus, whereby the transmission of the remaining portion of a verification number causes the connection to be extended to the called line, and disabling means controlled by the verification recording means for disabling the said busy-test means and for making connection with the called line when marked busy, second trunks interposed between the first trunks and the lines, the automatic switching apparatus comprising a first portion for extending a connection from any first trunk to any idle second trunk in response to a first portion of a transmitted usual telephone number, the automatic switching apparatus further comprising a second portion controlled over any second trunk responsive to the transmission of the remaining portion of the usual telephone number to extend the usual connection to the called line, the busy-test means being in the second portion of the automatic switching apparatus, means controlled by the verification recording means for applying a verification mark to the second trunk taken for use, the said disabling means being responsive to the verification mark.

2. In an automatic telephone system as set forth in claim 1, wherein the said succeeding trunks comprise first and second portions, means associating the disabling means with the second portion of the succeeding trunks to the exclusion of the first portion thereof, and means controlled by the said verification recording means for selectively controlling the said means for operating the first portion of the automatic switching apparatus to preclude a verification connection to any succeeding trunk of the said first portion thereof.

3. In an automatic switching system according to claim 2, means associated with the switching apparatus for precluding usual connections to the said second portion of the succeeding trunks when at least one trunk of the said first portion of succeeding trunks is idle and available, whereby the second portion of succeeding trunks is normally reserved for verification connections.

4. In an automatic telephone system according to claim 1, wherein the said trunks comprise first trunks, second trunks and succeeding trunks interposed in tandem between the first trunks and the lines, the said automatic switching apparatus comprising a first portion for extending a connection from any first trunk to any idle second trunk in response to a first portion of a called usual telephone number, the automatic switching apparatus further comprising a second portion controlled over any second trunk responsive to the transmission of a second portion of the usual telephone number to further extend the connection to any idle succeeding trunk, the automatic switching apparatus further comprising a succeeding portion controlled over any succeeding trunk responsive to the transmission of the remaining portion of the usual telephone number to extend the usual connection to the called line, the said busy-test means being in the said succeeding portion of the automatic switching apparatus, means controlled by the verification recording means for applying a verification mark to the second trunk taken for use, responding means associated with the last said second trunk responsive to the transmitted verification mark for applying a verification mark to the succeeding trunk taken for use, the said disabling means being responsive to the last said verification mark.

5. In an automatic telephone system according to claim 4, wherein the second trunks and the succeeding trunks each comprise a first portion and a second portion, means associating the said responding means with the second portion of the second trunks to the exclusion of the first portion thereof, means controlled by the said verification recording means for selectively controlling the said means for operating the first portion of the automatic switching apparatus to preclude a verification connection to any second trunk of the first portion of the second trunks, means associating the disabling means with the second portion of the succeeding trunks to the exclusion of the first portion thereof, and means controlled by the said responding means for selectively controlling the said means for operating the second portion of the automatic switching apparatus to preclude a verification connection to any succeeding trunk of the said first portion of the succeeding trunks.

6. In an automatic telephone system according to claim 1, wherein the first trunks comprise a first group for extending both usual and verification connections as set forth and a second group for extending only usual connections as set forth, means responsive to the transmission of the common verification prefix digit over any trunk of the said second group for preventing the subsequent transmission thereover of the remaining portion of a verification telephone number from resulting in the connection being extended to the called line.

7. In an automatic telephone system according to claim 1, wherein the first trunks comprise a first class group for extending both usual and verification connections and a second class group for extending only usual connections, means for applying a class mark to any succeeding trunk according to the class of the first trunk connected thereto, and means rendering the said disabling means jointly responsive to a said verification mark and to a said class mark.

8. In an automatic telephone system according to claim 2, wherein the said means for operating a first portion of the automatic switching apparatus comprises a controller common to the said first trunks, means responsive to the transmission of the said first portion of a usual telephone number, whether or not preceded by the verification prefix, for associating the controller specifically with the calling first trunk, means for thereupon causing the controller to select an idle succeeding trunk and to operate the said first portion of the automatic switching apparatus to extend the connection thereto, and means controlled by the said verification recording means for preventing the controller from selecting any idle trunk of the said first portion subject to the verification prefix having been called.

9. In a digit-controlled switching system wherein automatic switching apparatus is employed for connecting any calling one of a group of first trunks to any idle trunk in any one of a number of groups of second trunks, respective digit values being assigned to the groups of second trunks, with one digit value unassigned, each first trunk having a counter for counting the impulses in a received digit series and for marking the corresponding one of the second groups, a controller common to the first trunks, means responsive to the counter of any first trunk counting the impulses in a digit series of any digit value for temporarily associating the common controller with such trunk, means responsive to the counter having counted the number of impulses corresponding to the digit value assigned to any group of second trunks for holding the common controller and for causing it to control the automatic switching apparatus to connect the calling first trunk to an idle trunk in the called second group, and means responsive to the counter having counted the number of impulses corresponding to the said unassigned digit value for forthwith releasing the common controller and for clearing out the counting means in readiness for a further counting operation.

10. In a switching system according to claim 9, means responsive to the counter of any first trunk counting the said unassigned digit value a second time for disabling the counter and for applying a busy signal to the calling first trunk.

11. In a switching system according to claim 9, means responsive to the counter of any first trunk counting a further digit series of any value following the counting of the said unassigned digit value for calling in the common controller a second time and for indicating thereto that the said unassigned digit value has been called and absorbed.

References Cited in the file of this patent

UNITED STATES PATENTS

| | | |
|---|---|---|
| 1,929,587 | Hopf | Oct. 10, 1933 |
| 2,317,833 | Voss | Apr. 27, 1943 |
| 2,337,365 | Bakker | Dec. 21, 1943 |
| 2,365,996 | Bakker | Dec. 26, 1944 |
| 2,513,964 | Pearce et al. | July 4, 1950 |